United States Patent
Lastinger et al.

(10) Patent No.: US 7,030,731 B2
(45) Date of Patent: Apr. 18, 2006

(54) WIRELESS IDENTIFICATION SYSTEMS AND PROTOCOLS

(75) Inventors: Roc Lastinger, Mesa, AZ (US); James Rodgers, Mesa, AZ (US); William Fowler, Phoenix, AZ (US); Dean Freiwald, Mesa, AZ (US)

(73) Assignee: RF Code, Inc., Mesa, AZ (US)

( * ) Notice: Subject to any disclaimer, the term of this patent is extended or adjusted under 35 U.S.C. 154(b) by 268 days.

(21) Appl. No.: 10/172,713

(22) Filed: Jun. 14, 2002
(Under 37 CFR 1.47)

(65) Prior Publication Data

US 2003/0030568 A1 Feb. 13, 2003

Related U.S. Application Data

(60) Provisional application No. 60/298,322, filed on Jun. 14, 2001.

(51) Int. Cl.
*H04Q 5/22* (2006.01)
*G08C 19/12* (2006.01)
*G08C 25/00* (2006.01)
*G06F 11/00* (2006.01)

(52) U.S. Cl. .................... 340/10.1; 341/178; 341/179; 714/799; 714/823

(58) Field of Classification Search ............. 340/10.1, 340/539.13, 573.1, 573.3, 573.4; 342/118, 342/126, 127, 128; 714/52, 799, 823; 341/173, 341/178, 179
See application file for complete search history.

(56) References Cited

U.S. PATENT DOCUMENTS 5,119,104 A * 6/1992 Heller ...................... 342/450
5,168,263 A 12/1992 Drucker
5,168,510 A 12/1992 Hill
5,317,309 A * 5/1994 Vercellotti et al. ......... 340/10.5
5,844,482 A * 12/1998 Guthrie et al. ........... 340/572.4
5,929,779 A 7/1999 MacLellan et al.
5,940,006 A 8/1999 MacLellan et al.
5,942,987 A 8/1999 Heinrich et al.
6,067,018 A * 5/2000 Skelton et al. ........... 340/573.3
6,170,748 B1 1/2001 Hash et al.
6,414,635 B1 * 7/2002 Stewart et al. .............. 342/457
6,529,164 B1 * 3/2003 Carter ....................... 342/463
6,720,888 B1 * 4/2004 Eagleson et al. .......... 340/10.1
2002/0057192 A1 5/2002 Eagleson et al.
2002/0153996 A1 10/2002 Chan et al.

OTHER PUBLICATIONS

Derwent abstract of EP 108094B (publication date: Oct. 14, 1987).*

* cited by examiner

*Primary Examiner*—Brian Zimmerman
*Assistant Examiner*—Clara Yang
(74) *Attorney, Agent, or Firm*—Allen J. Moss; Squire, Sanders & Dempsey L.L.P.

(57) ABSTRACT

Monitoring systems and protocols are disclosed that are flexible in mode operation and format depending on the environment in which they are used. Such monitoring systems and protocols are able to change their utilization automatically, or by received instruction to do so. A location detection system includes one or more low frequency transmitters, one or more radio frequency monitoring tags and one or more receiving devices. The low frequency transmitter transmits location identification information, such as the transmitter ID, to a tag in the vicinity of the transmission. The tag relays the transmitter ID using a higher frequency transmission sent from the tag to the receiver. Communication protocols are disclosed that enable deciphering of multiple tag transmissions starting simultaneously.

26 Claims, 10 Drawing Sheets

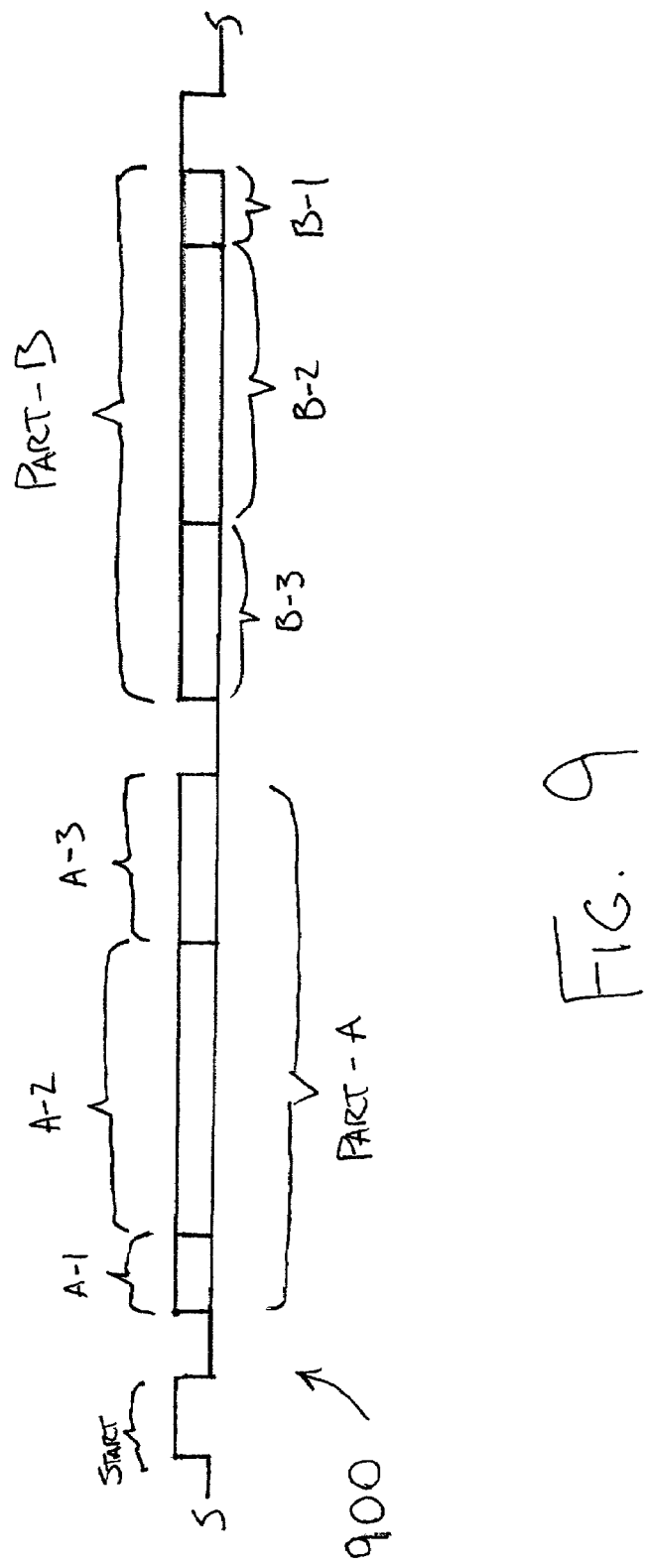

WIRELESS IDENTIFICATION SYSTEMS AND PROTOCOLS

PRIORITY

This application claims benefit under 35 U.S.C. § 119(e) of U.S. patent application Ser. No. 60/298,322 which was filed on Jun. 14, 2001 and is incorporated herein by this reference.

BACKGROUND

1. Field of the Invention

The present invention relates to wireless identification systems and protocols and more specifically to systems used for detection, identification, control and/or location of events and/or objects.

2. Related Art

Conventional data communication systems have been applied to accomplish object identification using the medium of radio broadcast. Such radio frequency identification (RFID) systems find application in the fields of materials handling, inventory control, and generally in the field of tracking personnel, objects, and animals.

Wireless monitoring systems, such as tag systems, are well known for detecting, locating and/or identifying coded articles. A variety of techniques and systems have been used to determine the identification and/or location of a suitably tagged article. Two basic approaches exist for these tag systems:

The first approach is the use of tags that intermittently or repetitively beacon or broadcast identification, status, or other sensor information without necessarily requiring interaction from other devices. When thousands of beacon type tags are present in a confined environment the intermittent broadcasts often overlap or collide and difficulty is encountered in distinguishing reception of overlapping or colliding broadcasts from multiple tags. In an attempt to overcome this problem, it is known to vary the periods between tag broadcasts, vary the length and type of tag transmissions and other types of variations to provide broadcast diversity in multiple tag environments. This type of intentional variation in tag broadcast is referred to as non-synchronous or Type I transmissions.

A second approach is to use tags that are able to receive transmissions from other devices or sense the occurrence of an event. In this approach, the tags receiving transmissions from other devices may respond to such transmissions by broadcasting information. This approach is analogous to an interrogate and respond system where when information is desired from the tag, a transmission is sent to the tag requesting that it respond with, for example, identification, location, sensor information. When a request for information transmission is broadcast, for example by a reader unit or interrogator, the tags in the area of broadcast respond by transmitting the requested information in their own broadcast. This second type of transmission is referred to as a synchronous or Type II transmission.

These systems are designed for the detection of a single type of event, such as the detection of a merchandise tag entering a designated area and are directed to a particular application having predetermined surveillance area (e.g., adjacent to and exit or loading/unloading point). Conventionally, these systems are typically designed and preset for specific applications and thus different tags and equipment are required for various differences purpose (e.g., beacon type tags verses responding or interrogation type tags). These specific designs represent fixed configurations of systems for utilization with particular applications.

In other applications multiple receivers are positioned at selected points in a surveillance area, for example distributed throughout a warehouse. The receivers are able to identify a location of a tag by for example, the time of receipt, angle of arrival, signal strength and/or phase difference of the transmissions from the transmitting tag or tags.

Conventionally, these systems are confined to single purpose applications. Different tags, readers, protocols and software are required for different system applications. The foregoing systems tend to be relatively complex and expensive because: (i) the number of receivers deployed for surveying an area increases costs of such systems; and (ii) the predefined function of a tag or system requires specific equipment and inventories for each type of application, which also increases associated costs.

Accordingly, it would be beneficial to have monitoring systems and protocols that are flexible depending on the environment in which they are used, wherein such systems and protocols are able to change their utilization automatically, or by programmed instruction to do so.

Moreover, it would be advantageous to have a location detection system where the numbers of complex receiving devices can be reduced.

It would further be advantageous to have monitoring systems that are configured so that tag collisions (i.e., simultaneous receipt of tag transmissions) can be reduced or deciphered and validated more effectively.

BRIEF DESCRIPTION OF THE DRAWING

Additional aspects, features and advantages of the present invention will become more apparent from the following description of the appended drawing in which like reference numerals denote like elements and in which:

FIG. 9 is a message word format including subparts.

DETAILED DESCRIPTION OF THE PREFERRED EMBODIMENTS

Location Montoring Systems

Figure 1A:
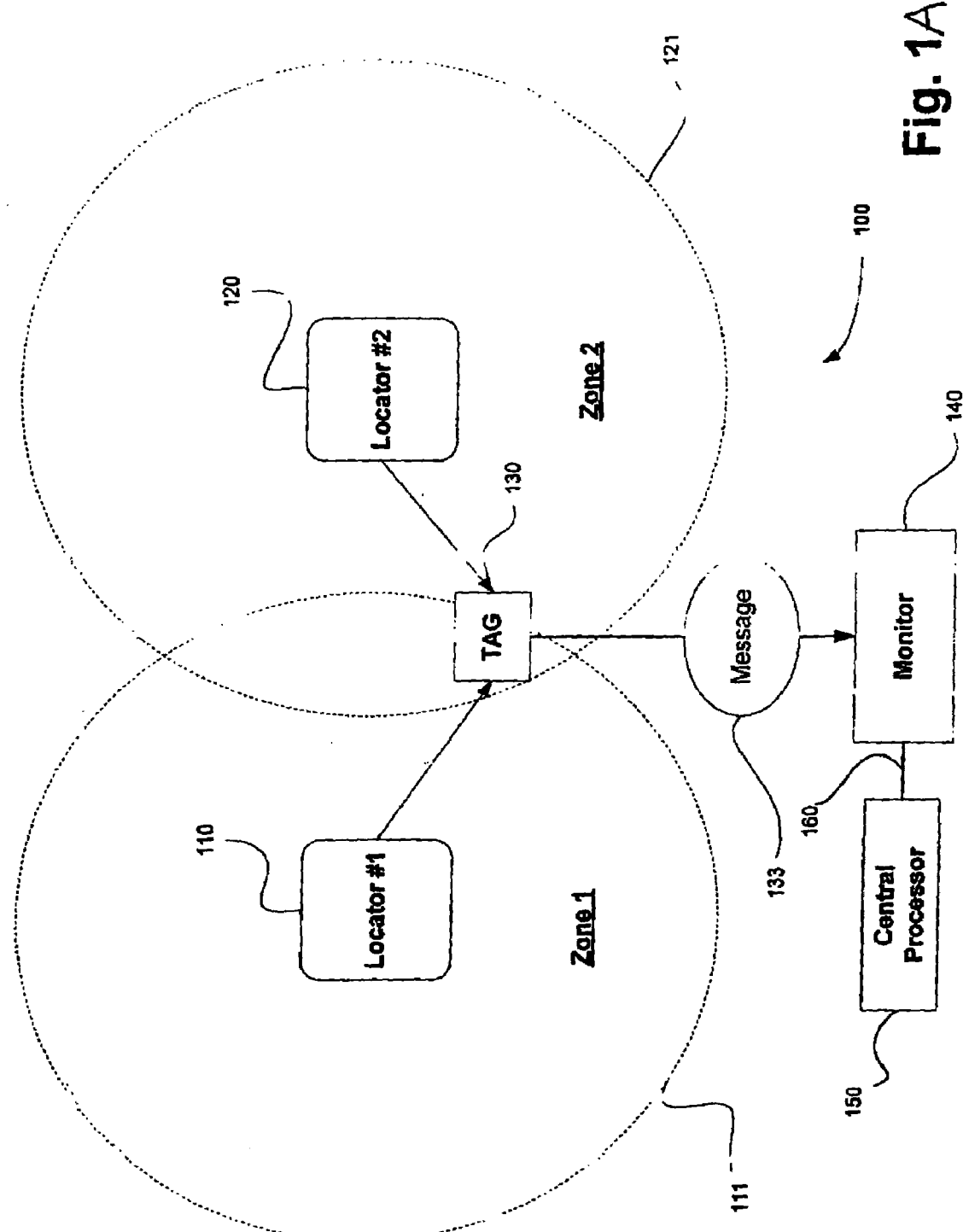
FIGS. 1A and 1B is plan views of an exemplary monitoring system according to various aspects of the present invention.

Systems according to various aspects of the present invention track the location and movement of objects, animals or personnel for maintaining inventory status, providing access to portions of a facility (e.g., unlocking doors for a particular personnel), directing materials handling equipment, and assisting in discovering the location of objects, animals and personnel.

For example, a system according to various embodiments of the invention includes a transmitter or locator unit to broadcast information within a localized area. This type of transmitter is referred to herein as a "locator" or "locator unit." The following terms are also assigned the following meanings: "area" is defined to mean a physical position or a facility (e.g., a yard, building, floor, suite, bay, or unit of storage space); "locator ID" is an identification of a locator that is broadcasting; "zone" is an area of signal reception that may be defined by a strength and direction of signal broadcast as well as a sensitivity of a particular receiver; "tag ID" is an identifying piece of information that uniquely defines a tag or tag function; "Beacon rate" is the reciprocal of the sum of duration of transmitting a message and the time between message transmissions; "synchronous" means Type II transmissions that are synchronized at the receiver end according to a query/response protocol; "asynchronous" or "non-synchronous" means Type I transmissions which have no regard to a receiving device or other broadcast signal; a "tag message" is a broadcast from a tag.

A monitoring system according to various aspects of the present invention may be used to track identification and position of, for example, inventory, order movement, and/or shipments of articles each having monitoring tags attached thereto. By way of example, a warehouse or other facility housing a large number of articles may have a plurality of fixed low frequency transmitters or "locators" positioned at various locations around the warehouse, each transmitter having a specified zone of transmission. A grid or matrix of such fixed locators may be arranged to have overlapping zones of transmission to increase the accuracy of locating of tagged items. When each locator broadcasts location information (e.g. Locator ID, geographical coordinates), any tags in the respective zone of transmission respond by broadcasting their own transmissions. Such tag broadcasts include the location identification information received from the one or more locators that initiated the tag broadcast. A receiving device or monitor may receive the tag broadcasts and associated processing equipment may determine a location of the responding tags using the location identification information. By overlapping zones of transmissions, the tags may be located with greater accuracy (e.g., between the overlapping area of two or more zones).

Locators may also be positioned at various doorways, access points, processing devices (e.g., loaders or assembly line points) or other areas of interest to enable the monitoring system to detect when the tag (and associated article) reaches such an area of interest. In this case, the locator zones of transmission may not overlap with other locators since it may only be desired to know when a tag enters into the zone of transmission of a specific locator.

Turning to FIG. 1, a monitoring system 100 may include one or more locators 110, 120, one or more tags 130, and one or more monitors 140.

Locators 110, 120 serve the function of broadcasting transmissions, including location information, in an area to be monitored. Tags 130 serve the purpose of receiving information broadcast from locators 110, 120 and broadcasting their own transmissions including the location identification information received from locators 110, 120. Monitors 140 serve the purpose of receiving broadcasts from tags 130 or other transmit devices such as locators 110, 120. Monitor 140 may also function to process received information and/or provide received information to one or more processing units 150 over a wireless or wired network 160.

Each locator 110, 120 has a zone 111, 121 for which it is set to broadcast and a unique Locator ID associated therewith. If a tag (e.g., tag 130) is present in zone 111 or zone 121 the tag receives the locator broadcast (including Locator ID) from each respective locator. Each tag receiving a locator broadcast then broadcasts its own message, including the Locator ID, Tag ID and any other sensor and control information such as battery status, time of day, etc. (collectively, message 133). Monitor 140 receives and decodes the tag broadcast and passes the decoded information through network 160 to processor 150. Processor 150 then tracks the identification and determines the location of tag 130 based on the Locator ID and Tag ID.

If tag 130 falls in an area of overlap of two or more zones, e.g., zone 111 and zone 121 (as shown), one or more messages 133 may include both Locator IDs for respective locators 110 and 120. In this manner, processor 150 can locate tag 130 with increase accuracy because of the limited area of overlap between zone one and zone two.

Message 133 may include one or more of the following pieces of information:
Tag ID;
Locator ID, IDs and/or other geographical information such as GPS coordinates;
SSI (signal strength indicator) of received locator signal (may include more than SSI if receiving more than one locator signal); and
Time of Day or other pertinent information such as battery level, last transmission, control codes, etc.

Locators 110 and 120 may be any device or combination of devices for performing the functions of broadcasting location information (e.g., Locator ID, positional coordinates) in a predefined area or zone. In a preferred embodiment, because of their relatively close proximity to tags, locators 110 and 120 emit relatively low power and relatively low frequency transmissions. Locators 110 and 120 may also use extremely directional antennas that limit the range of respective transmissions to prevent significant overlapping of locator transmissions. The addition of more locators and overlapping zones of transmission can be used to increase the accuracy of location determination.

Figure 1B:
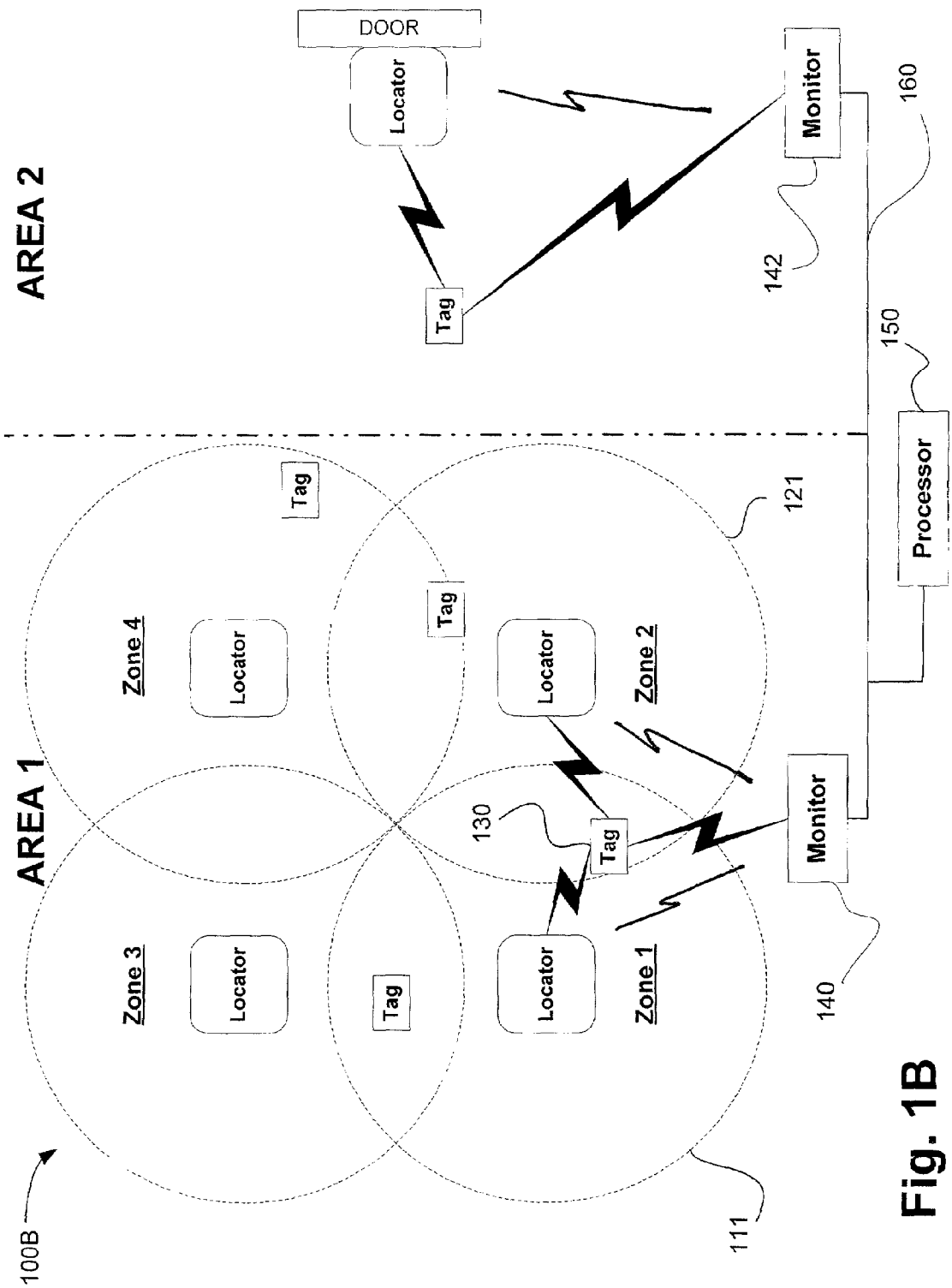

Referring to FIG. 1B, system 100B includes four locators each having respective broadcast zones. System 100B also includes an additional a second monitor 142 serving to monitor a different area, e.g., AREA 2. Monitors 140 and 142 communicate with processor 150 and/or each other via a wireless or wired network 160 to track and determining location of tags in one AREA 1 while simultaneously tracking information in AREA 2.

Tag 130 may be any device or combination of devices operative to receive a transmission from at least one locator and to broadcast its own message, including received location information (e.g., Locator ID) to monitor 140. In an optional embodiment, tag 130 includes a signal strength analyzer circuit for distinguishing the signal strengths received from the transmissions of respective locators 110 or 120. By distinguishing the received signal strengths, tag 130, or monitor 140 and its associated processor, may distinguish between locator broadcast zones 111, 121. For example, if tag 130 determines that the strongest transmission is associated with locator #2 tag 130 may broadcast only the Locator ID for locator #2 even though tag 130 also received a weaker signal from locator #1. By distinguishing the locator with the strongest transmit signal it may be deduced that tag 130 falls closer to within the boundaries of a particular locator broadcast zone. In an alternative embodiment, the Locator IDs of both Locators 110 and 120 may be broadcast by tag 130. In this case, preferably the Locator IDs would be arranged in a hierarchical manner according to signal strength to indicate that tag 130 is closer to one locator than the other (e.g., locator 120 ID and followed by locator 110 ID).

Monitor 140 may be any device or combination of devices for receiving location identification broadcast by tag 130. For example, monitor 140 may be an RF receiver receiving wireless transmissions from tag 130 and/or locators 110, 120. Moreover, monitor 140 may also include, or be connected to, a respective processing unit 150 for determining locations based on the received location information.

The use of relatively inexpensive transmitting devices as locators 110 and 120, assists to reduce the number of more complicated and expensive monitors 140 required for a location identifying monitoring system. However, the present invention is not limited to unidirectional transmissions and receptions and may also, for example, utilize locators that transmit to tags and receive from tags as well. Using this approach with the SSI (signal strength indicator) circuitry, tag 130 may respond only to the specific locator that lies nearest (i.e., locator 120). With bi-directional communications the locators may communicate information to monitor 140 or directly to a processing device (e.g., if the locators were networked to a computer system).

A further modification of system 100 is to include multiple antennas on the locators or tags that serve to triangulate a position of the tags. For example, a tag can have two input antennas each at ninety degrees, or some other predefined angle to each other, to assist in calculating the direction of reception and from the locators. Alternatively and/or in addition, locators 110, 120 may include multiple antennas for triangulating position to a more accurate degree.

As discussed in respect to FIG. 1B, system 100B includes a plurality of fixed locators which operate determine a detailed fine location of the tag. This is a greatly enhanced feature in warehousing and other applications where not only the presence of an item can be determined, but also its fine location can be determined in a low-cost system with only a limited number of monitors. If a series of locators are positioned in a line or in a two directional pattern, then the detailed location of the tag can be readily determined. The equations that determine position for a distance equal to half of the distance of alternative pointers match up at the transition points. For example, if pointers A, B, C and D are each located ten feet apart and the tag is located under pointer B, then pointers A and C can determine the tag position within the range of plus and ±2.5 feet from B with high linearity. If the tag is moved to half way between pointer B and pointer C, the equation calculates the position using data from B and D. This process can be repeated in a long line or in an area or volume with both x, y and z positioning. Any combination of the foregoing alternatives or modifications may also be pursued and is to be considered within the scope of the present invention.

The present invention is superior to the high frequency operation required in ranging or time-measurement systems of the prior art systems. High frequency operation can cause problems for certain operating environments, for example, operation in a building with an abundance of signal absorbing and reflecting equipment and materials. In contrast, the locator transmissions used in the present invention can operate using a frequency on the order of 125 Khz range. Since signal attenuation decreases with frequency, the lower transmit frequencies easily penetrate items and personnel. In the present invention, as opposed to many conventional systems, the output frequency of tag 130 is not necessarily used to determine location of the tag, e.g., using time of receipt, triangulation or phase angle determinations. If the tag transmits in the typical three to nine hundred MHz range, a great deal of transmit overlap can be provided to insure reception by monitor 140.

Figure 2:
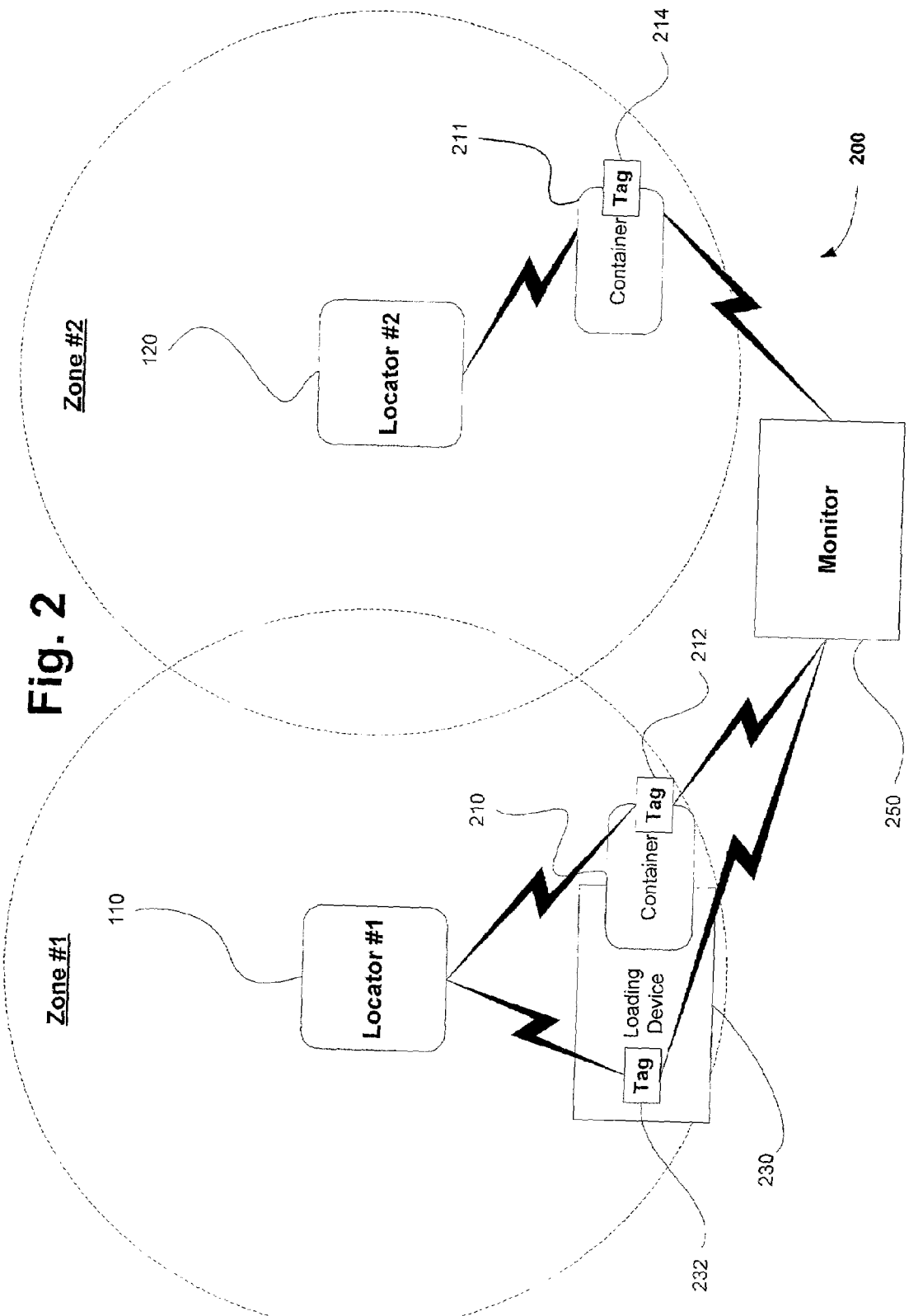
FIG. 2 is a plan view of the FIG. 1 monitoring system in use with a loading device and containers.

Turning to FIG. 2, utilitarian aspects of a monitoring system will now be described. In example system 200, one or more container units 210, 211 each include respective tags 212, 214. Locators 110 and 120 are placed at strategic positions in and around a facility or area. Locators 110 and 120 inform loading device 230 (e.g. an automated forklift, robotic loader or part carrier) where the tags 212, 214 (and associated containers 210, 211) are within a few feet. If loading device 230 includes its own tag 232, the position of loading device 230 may also be tracked and/or determined using locators 110, 120. As previously discussed, locators 110, 120 broadcast low frequency location identification information (e.g., Locator ID's or geographical coordinates). Tags 212, 214, and 232 may receive the locator broadcast and in response to receiving the locator broadcast, begin broadcasting their own message which includes the location identification information, in the same format or another. A reader or receiving device such as monitor 250 may receive broadcasts emitted from tags 212, 214 and 232 and use the location identification formation to determine a location of one or more containers 210, 211 and/or loading device 230.

Monitor 250 represents a receiver and/or an associated computer system for receiving, tracking and storing location identification information broadcast from tags 212, 214, and 232. Monitor 250 may be located centrally or on the loading device itself.

In a basic system, the location of loading device 230 can be identified within a few feet. By analyzing signal strength strengths of tag and/or locator broadcasts, the accuracy of location monitoring can be increased. Furthermore, signals received from multiple locators can be tolerated and distinguished.

The locator and/or tags can include multiple antennas that serve to triangulate position received broadcasts. If, for example, tag 232 on loading device 230 includes one antenna directed to the left and one antenna directed to the right, the position of tag 232 (and hence loading device 230) can be readily determined in respect to known positions of locators 110, 120. One way of determining this position is to subtract the signal received from locator 110 from the signal received from locator 120. If loading device tag 232 is precisely located halfway between locators 110 and 120, the output would be zero. If loading device moves in one direction closer to one locator than the other, the output provides one value and if the same distance is moved in the opposite direction the value would be the same only with a reversed sign. If this difference is divided by the absolute sum of the two locator signals or another locator signal located between the two, then a radiometric relationship may be derived and maintained. Many different antenna angles and methods can be utilized to obtain the same detailed position resolving information. The actual calculations can be performed in the tag or the information broadcast to a receiver and system for processing (e.g., monitor 250) or a combination of methods can be employed.

Figure 3:
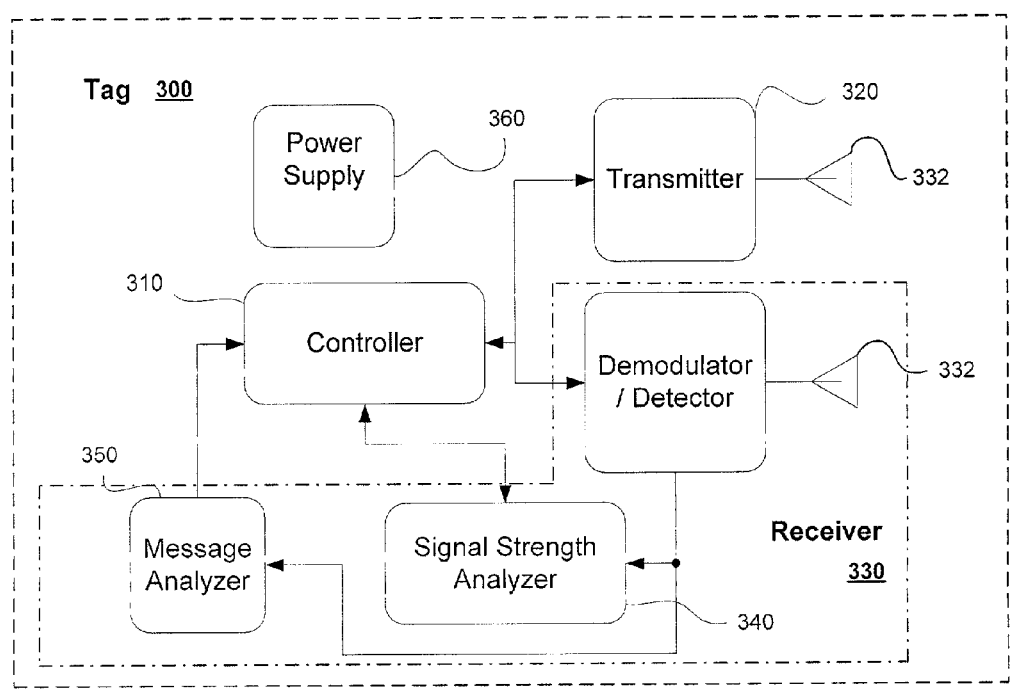
FIG. 3 is a functional block diagram of a tag according to various aspects of the present invention.

Referring to FIG. 3, a location monitoring tag 300 according to one aspect of the invention preferably includes controller 310, transmitter 320, and receiver unit 330, and an optional power supply or cell 360. Receiver unit may include signal strength analyzer 340, message analyzer 350 and a detector/decoder.

Tag 300 functions to receive signals having location identification information through receiver 330, optionally, analyze strengths of received signals if more than one signal is received, and broadcast signals including received location identification information, such as a Locator ID or navigational coordinates or the like. Tag 300 may further transmit its own identification information, control data and status information as well as any information received from other devices such as Locator IDs or other location information received from a locator unit. Such information can serve to determine the location of tag 300 since a locator unit is in a fixed defined location or located on a vehicle equipped with a global positioning system (GPS) receiver (see below). Tag 300 may also send battery status, input data and other information in one transmission word or a series as required.

Transmitter 320 may be any device or combination of devices for transmitting a signal. In an optional embodiment, transmitter 320 has dual output stages that operate together, for example, with one having zero degrees carrier phase and the other having ninety degrees carrier phase, or alternatively, the two outputs can be sequentially operated without regards to phase. The two outputs may function to drive multiple directional antennas for optimum performance at all angles when tag 300 is located on metal objects.

Transmitter 320 may have the capability to operate in different modes such as slow beacon only output, or a fast interrogated output, as discussed in more detail below. Transmitter 320 may output a single word or up to eight words in a continuous transmission or independently with each having sixteen bits of data to enable tag 300 to handle billions of ID codes.

In an example embodiment, transmitter 320 has the following features:
Output frequency of 433 MHz;
Output power level of 30 MW DC Maximum (Output stage) (set to correspond to 100 uV Meters Quasi Peak measured at 3 Meters (USA) or 500 uV Peak at 3 Meters (Japan);
Interrogated output rate of 0.25, 1.0, 10 (default) and 100;
Beacon only output rate of 1.0, 10 (default) and 100;
Dual state output, e.g., zero degrees (e.g., planar antenna on card, and ninety degrees (e.g., vertical or external antenna);
Data output
Format: Type 1 for Beacon Mode; and Type 2 for Interrogated Mode;
Modulation: amplitude ONOFF, Pulse Width;
Data Type: NRO (minimized DC Slew) Modified Manchester;
Clocking Type: self-clocking (RSCK);
Clocking Rate: 19.2 KBPS Nominal;
Transmission Rates: Max 0.25 second, next 1 second; next 10 second (default); Min. 100 seconds (programmable by locator or setup unit);
Data Format:
Type 1-UMS (Universal Monitoring System) Programmed Time Periods (Beacon or Non-Synchronous Interrogation Mode) with encoding key;
Type 2-UMS Hierarchical (interrogated mode) with encoding key (optional alternative or both);
Dibit Encoding—Dibit (2 quaduature encoded bits where $2^{nd}$ bit is complement of $1^{st}$ bit) where Data Bit 0=00, Data Bit 1=11, Control Start/Reset Bit=10, Control Stop/EOW (end of word) bit=01;

Data and Control Bit Recovery Key: must match encoding, both data and control outputs data and control outputs data and controls must be complement to be valid, controls must lead or follow data, controls and data must pass collision tests defined below.
Word Format:
Word Length—24 dibits
Word Codes—64,000 (extra codes are reserved for control or special purposes)
Word Format—
Start=1 (Dibit) (01 Code))
Fixed=2 (01 Dibits) (10 Code)
Word #=3 (Dibits) (10 or 11 Code)
ID/Data=16 Dibits (10 or 11 Code)
Parity=1 Dibit (10 or 11 Code)
Stop=1 Dibit (01 Code)
Word Transmission Period—2.5 Msec. (limited by receiver chip)
Dual Word Transmission Period—5.42 Msec.
Eight Word Transmission Period—21.68 Msec.
Message:
# of Words—1–8 (words can be sent one at a time or contiguous with added four stop dibits between words);
# of Codes—64,000 to the $7^{th}$ or $8^{th}$;
Message Check Word—Last word sent in a continuous message can be a message check code if desired (optional).

Receiver unit 330 may be any device or combination of devices for receiving and/or decoding a signal from a tag (e.g., tag 130; FIG. 1). Receiver 330 is preferably capable of receiving a carrier signal in the range of 100 KHz to 13.56 MHz (depending on optional chip selection) from a setup unit or a locator unit. The locator unit(s) can operate independently or synchronously under the control of a centralized control unit. Receiver 330 preferably receives a wakeup or start signal of eight bits or more followed by a twenty-four bit word individually or in groups of up to eight words. Receiver 330 optionally operate in sampling mode where receiver 330 turns on and off intermittently. For example, it turns on for 100 usecs every 80 msecs (i.e., 800 to 1). This corresponds to a broadcast from a locator unit having a start pulse length of 100 usecs and a repetition rate of 250 msecs or less. Sampling in this manner enables receiver 330 to minimize power drain and hence, maximize battery life. Functions of receiver 330 and transmitter 320 may be combined into a single transceiver unit or they may be separate discreet units. Antenna 322 may be a single shared antenna or multiple antennas.

Controller 310 may be any device for controlling transmit and receive functions of tag 300. Controller 310 may also be used for controlling signal strength analyzer 340 or other optional and/or non-illustrated components present on tag 300. In a preferred embodiment controller 310 is a programmable micro-controller including a RAM for enabling write capability.

If present on tag 300, signal strength analyzer 340 enables detection of the strength of signals received by tag receiver 330. By measuring signal strength, distinguishing between received signal strength, or at least decoding signals having a minimum threshold signal strength, handling of multiple received signals is improved and determination of the location of tag 300 may be performed with improved accuracy.

Figure 4:
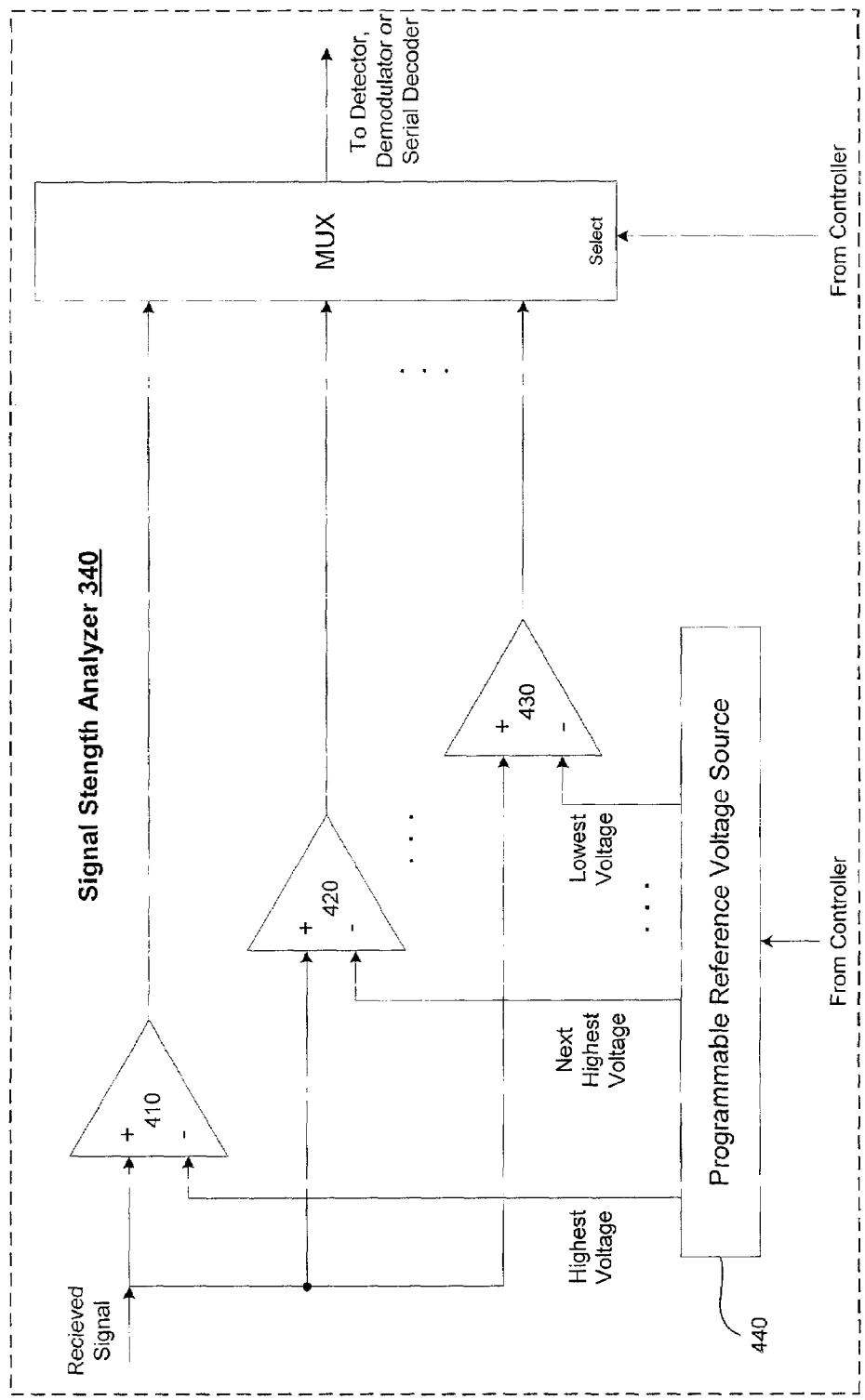
FIG. 4 is a functional block diagram of a signal strength analyzer according to various aspects of the present invention.

Turning to FIG. 4, a simplified signal strength analyzer 340 functions to identify differences in received signal strengths and/or select a signal with desired magnitudes.

Signal strength analyzer 340 may also serve to rate a plurality of received signals according to their magnitude. In one embodiment, analyzer 340 is a digitally settable pulse threshold circuit including a series of analog switches or digital comparators 410, 420 and 430. Comparators 410, 420 and 430 each receive a magnitude of a received signal in one of their two inputs. Analyzer 340 also preferably includes a reference voltage source 440 for providing varied reference levels to the second inputs of comparators 410, 420 and 430. The magnitude of received signals may be identified and/or measured based on predetermined voltage references provided by reference source 440. Controller 310 (FIG. 3) uses information from analyzer 340 to control transmission of information, e.g., only the Locator ID associated with the strongest received signal. Alternatively, controller 310 uses information from analyzer 340 to associate received signal strengths with the received locator IDs. The signal strengths of each received signal may be broadcast in the tag message. A monitor and associated processor may use such information subsequent processing. Any other type of device or combination of devices may also be used to perform the signal strength analyzing features discussed above.

Location Identification Using a Navigational Reciever

Figure 5:
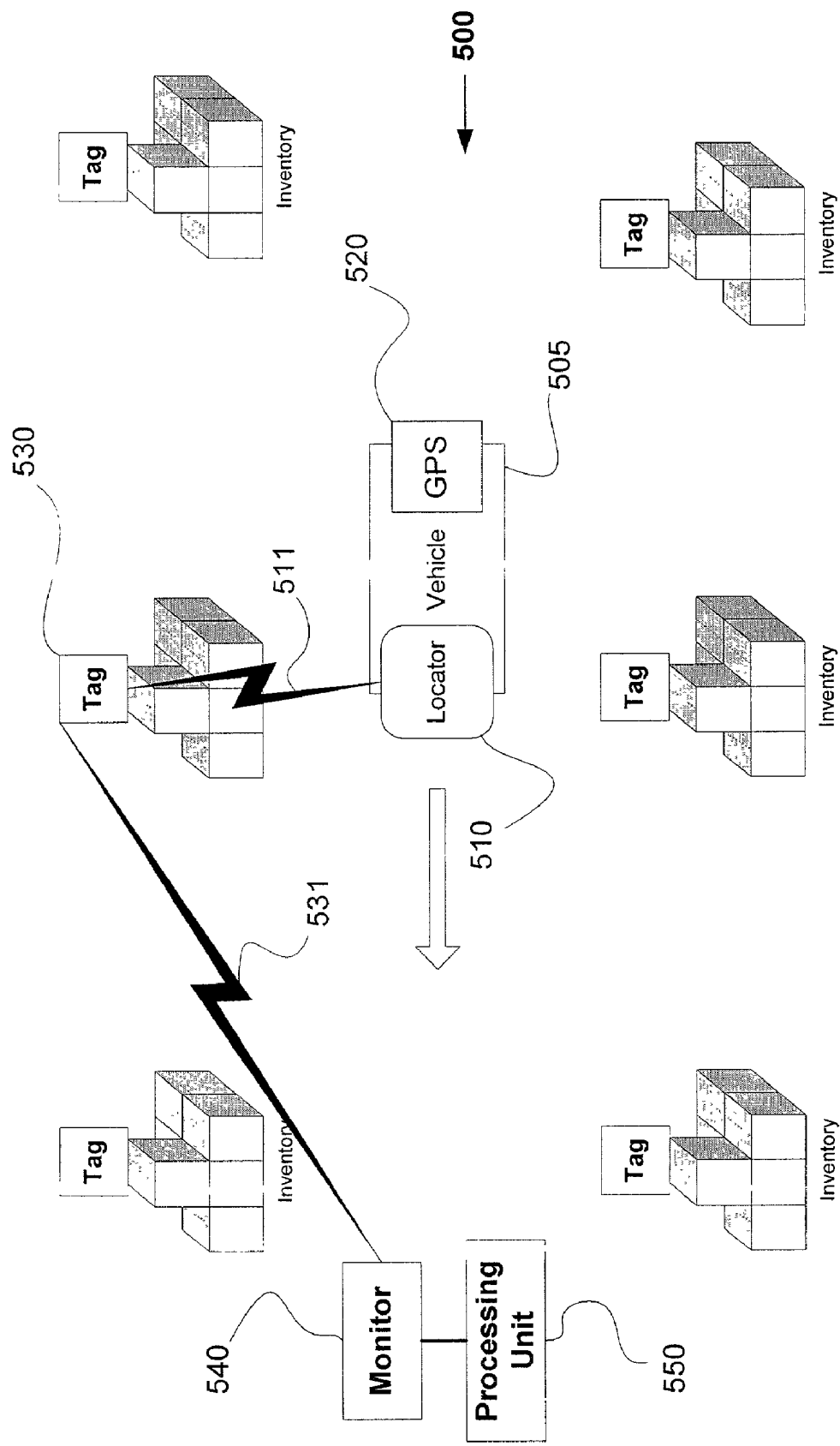
FIG. 5 is a functional block diagram of the system of FIG. 1 in implementation.

Turning to FIG. 5, another type of location monitoring system 500 of the present invention includes vehicle 505, locator unit or other type of transmitter 510, navigational information receiver 520, one or more tags 530, monitor 540 and processing device 550. The purpose of system 500 is to determine, identify and/or articles 580 such as inventory, and their location. System 500 utilized geographical coordinates or other navigational information to serve this purpose.

In this embodiment, locator unit 510 and navigational receiver 520 are affiliated with a position of, or attached to, vehicle 505. Locator unit 510 broadcasts location identification information 511 while vehicle 505 is in motion. The location identification information 511 preferably includes the current geographical position of vehicle 505 as determined by navigational receiver 520. As vehicle 505 moves past inventory 580, inventory tag 530 receives the location identification information broadcast 511 and responds by tag 530 broadcasting its own information 531 which preferably includes a Tag ID and the location identification information from navigational receiver 520. Area monitor 540 may then receive broadcast 531 and associate the Tag ID with inventory 580 and a geographical position.

Locator broadcast 511 activates each tag in local vicinity so that tagged items can be located and inventoried. System 500 can identify a rough location of each tagged item based on the navigational coordinates broadcast by the locator unit 510. This location identification information may be transmitted to the tags and relayed by the tags to monitor 540 for processing by processor 550. Alternatively, monitor 540 and/or processor 550 may be located on vehicle 505 and associate geographical coordinates based on the position of vehicle 505 when a broadcast from tag 530 is received. For increased accuracy, locator 510 should transmit extremely directional broadcasts.

In a modified aspect of the invention, system 500 does not require that geographical coordinates be transmitted to, and relayed by, the tags if the monitor or other reader device can discern the position of the vehicle using some other spacial relationship to the receipt of tag broadcasts. Such relationship might be derived by, for example, connecting monitor 540 to navigational receiver 520 or navigational coordinates may be broadcast to monitor 540 from a transmitter other than tag 530, such as locator 510. In a further aspect of the invention, a signal strength analyzer may be utilized by monitor 540 or tag 530 to further increase the accuracy of determining the location of a tagged item as discussed previously.

Mode Changing Monitoring Systems

According to various other aspects of the present invention, type of tags may also alternatively be able to send detailed location identification information in operation and under the instructions of a local locator or low frequency transmitter (LFT) as discussed above.

In conventional systems the functions tags and their mode of transmission (e.g., Type I and Type II) are largely predefined and not flexible in their use and thus may require that a merchant or supplier to carry more than one type of tag in an inventory depending on the desired functionality. The present invention includes tags that are capable of changing broadcast formats or function. The formats and/or function of the tags in the present invention can be changed automatically or initiated by, for example, a received transmission commanding the tag to change.

According to a first aspect of the invention, a tag that is idle (e.g., not moving) for a predetermined period of time may send a beacon in asynchronous format with time diversity to minimize collisions between received tag transmissions. However, when receiving certain transmissions from other devices, (e.g., interrogation from a locator or other device) the tag according to one aspect of the invention may begin to transmit in a synchronous format. The synchronous format allows all tags that are activated by the locator or other device, to transmit with a minimum of tag collisions. This type of switching enables faster transmit operation when needed, (e.g., instantaneous identification or location requests) as well as slower asynchronous operation at other times. The mode of tag operation can be selected as required to meet a particular situation at a particular time.

Figure 6:
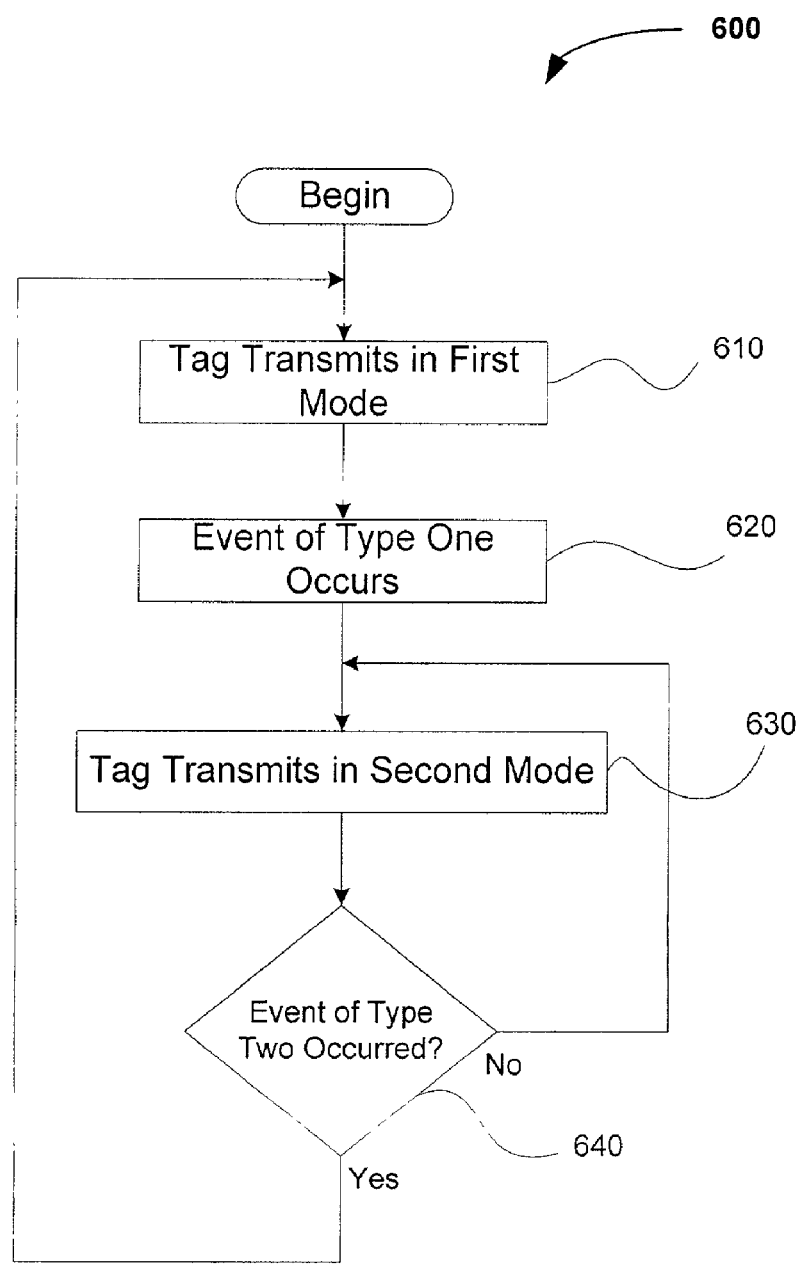
FIG. 6 is a flow diagram of a method of monitoring according to various aspects of the present invention.

Turning to FIG. 6, a method 600 for switching modes or formats in a wireless monitoring system includes generally, a tag broadcasting in a first transmit mode 610, a first event occurring 620, the tag transmitting in a second transmit mode 630 in response to the occurrence of the first event, and continuing to transmit in the second transmit mode unit the occurrence of a second event 640, the second event initiating the tag to return transmitting in the first transmit mode 620.

The first and second events can be selected for any type of event where it is desired to track the occurrence or non-occurrence of that event as discussed above where beacon mode is transmitted until a locator transmission is received (first event) when the tag begins transmitting in a second synchronous mode. In this case, the second event may be the expiration of a timer in the tag or a halt in receiving the transmission from the locator unit.

In a tag motion detection embodiment of the present invention, when the motion tag is idle for a certain period of time, the tag may send beacon asynchronous transmission (with time diversity) to minimize collisions. However, when motion tag starts in motion (e.g., first event), the tag will begin transmitting in a second transmit mode, for example, a synchronous transmission. In one aspect of the invention, the second transmission mode is exactly the same (e.g., same period and pulses) as the first transmit mode with the exception that when the tag detects movement, the beacon transmission resets and begins again. Such a reset during a previously uninterrupted pattern of beacon transmissions can be used by a monitor/detection processor to discern when particular tags are in motion. When the motion tag stops motion, or a timer expires, (e.g., second event), the tag returns to its first transmit mode.

Changing between the first and second transmission modes may include changing the content of the transmission as well as, or instead of, changing the format of transmission. In one aspect of the invention, the type of information transmitted from the tag can be varied automatically or by command. For instance, a beacon tag may be normally configured to transmit certain information such as its Tag ID, time of day, last movement, etc. as part of its message. However, according to one aspect of the invention, a locator or other transmit device may send instructions to the tag to change the content of the message being transmitted. Such change in content may be, for example, to include a battery level status or other type of content desired. In this case, the tag would begin to transmit the battery level in place of, or in addition to the last movement information. The substitution or addition of information may vary depending on the format utilized for transmitting (i.e., how much payload may be present in the tag message).

In another aspect of the invention, the periods, gaps, start pulse, end of word and other relevant message formatting information may be varied by a command from a transmitting device, e.g., locator or reader. The flexibility associated with being able to configure the format and content of tag transmissions using established transmitting units e.g., locators, provides significant advantages over the wireless monitoring systems of the prior art. By way of example, tags for certain types of inventory may be assigned a particular type of transmission format or content while tags for other types of inventory or new inventory be assigned a different transmission format or content, where such control and assignment is based solely on centralized software control and existing transmitters or locators rather than complicated setup units.

Figure 7:
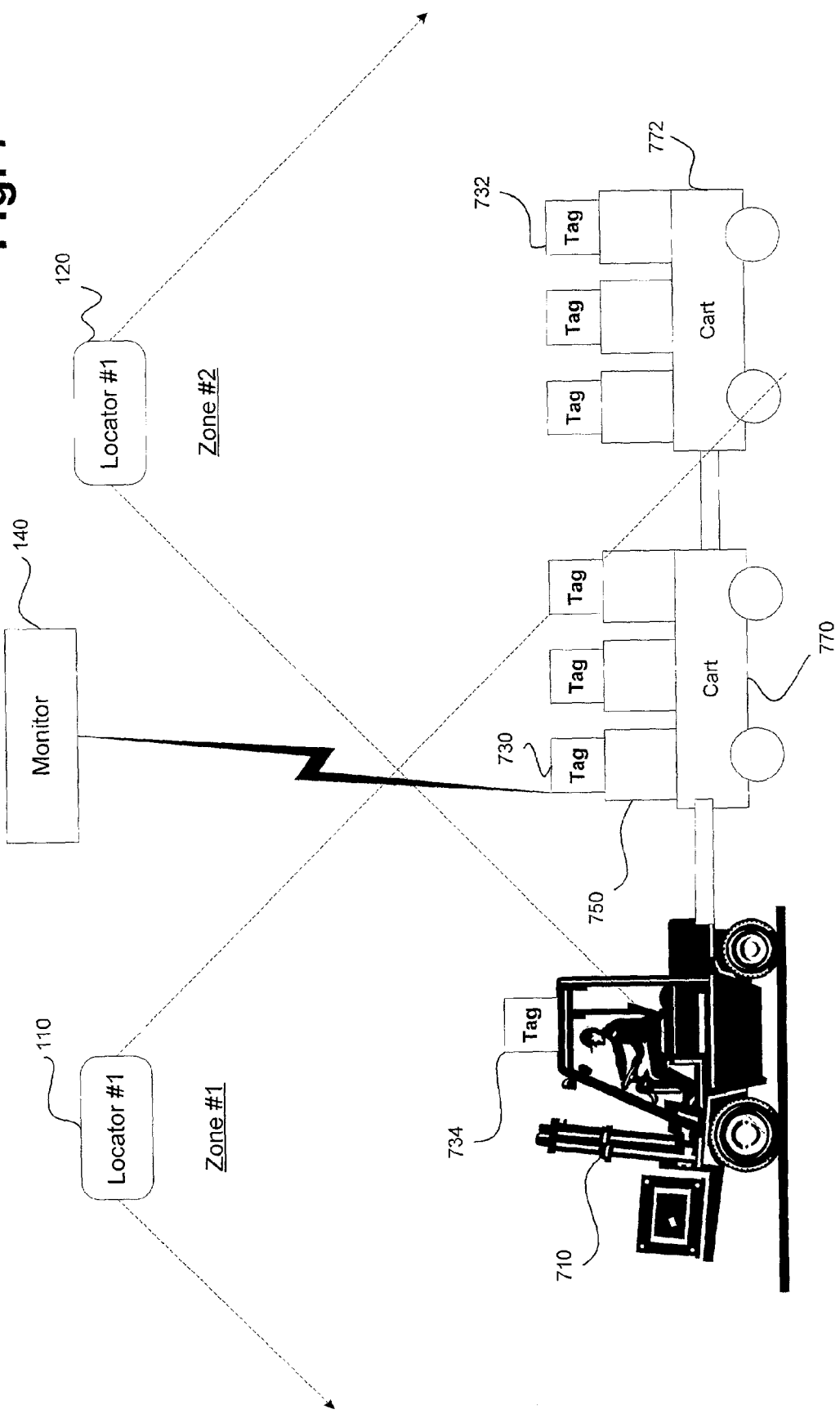
FIG. 7 is a functional block diagram illustrating a location monitoring system including a navigational receiver.

Referring to FIG. 7, one or more tags 730 may be, for example, mounted on a mobile package carrier 710 and transmitting its identification and/or other information at a slow beacon rate. During the slow beacon rate mode the presence and general location of tags 730 can be tracked within distances of, for example, a hundred feet. When mobile package carrier 710 moves through a door or other access point, tags 730, 732 come into close proximity of a locator unit (e.g., locators 110 or 120). When in close proximity, tags 730, 732 encounter a broadcast from locators 110 and/or 120. In response, tags 730, 732 begin to transmit information at a higher rate; such information including, for example, Tag ID as well as other information such as locator ID from locator 120.

In one aspect of the invention, locator units 110, 120 can instruct tags 730, 732 to switch into a different type of mode, for example, turn off, turn on, operate at low, medium or high rates, operate for a period of time and then turn off, change the type or formation of information tags 730 transmit, or in other desired modes. Using this type of selected operation, tag battery power may be conserved as the tag can be instructed to transmit only when necessary or desired. By way of example, a number of tagged packages 750 located on carts 770, 772 being pulled by a vehicle 710 through an area having locators 110, 120, can indicate their identification, where they are and their order behind the vehicle. Locator units 110 or 120 can turn off the tags when, for example, the package carriers are put on to an airplane and, conversely, they can be turned on when removed.

Each tag preferably comprises a transmitter, receiver, micro-controller/interface and an optional battery. A summary of the inventive hardware aspects include one or more of the following:
  Dual antenna outputs for diversity transmission;
  Extended battery life under pointer control;
  Local position input from pointer;
  Beacon and/or Interrogated Operation or Both;
  Encoded Bits for collision management;
  Dual anti-collision modes of operation including asynchronous and synchronous;
  External Programming on Board (external I/O);
  Write data and control capability;
  External reset input;
  Watchdog timer for automatic restart;
  Optional on board cell battery; and
  Sampling receiver for reduced power consumption.

The inventive tags, in conjunction with a pointer unit can be used to provide the following optional or programmable functional aspects:
  Turn on transmission when in range of the pointer;
  Turn on when in range of the pointer for a present mode and time when out of range;
  Turn on until turned off;
  Turn off until turned on;
  Turn off tag while in proximity and on when out;
  Select the tag mode and transmission rate;
  Send pointer unit address, data, control, and status information for instruction and retransmission in the same or alternative form; and
  Synchronize tag for operation in Type 1 format to minimize collision, speed up the read rate and provide time and data information.

Preferably, the tag transmitter has optional dual output stages that operate together with one having zero degrees carrier phase and the other having ninety degrees. Alternatively, the two outputs can be sequentially operated without regard to phase. The transmitter can operate in different modes such as a slow beacon only output or a fast interrogated output.

Monitoring System Communication Protocols

The Type 1 and Type II formats employ encoding and pulse positioning for communication in synchronous and non-synchronous environments. A significant aspect of these protocols is the concept of using the position of a pulse in a transmission as a means of coding the Tag ID or other information. Another important concept of the present invention is the transmission of complementary information to improve communication integrity. In addition, a pulse can be a single entity or it can be further broken down into sub pulses or encoded.

Figure 8:
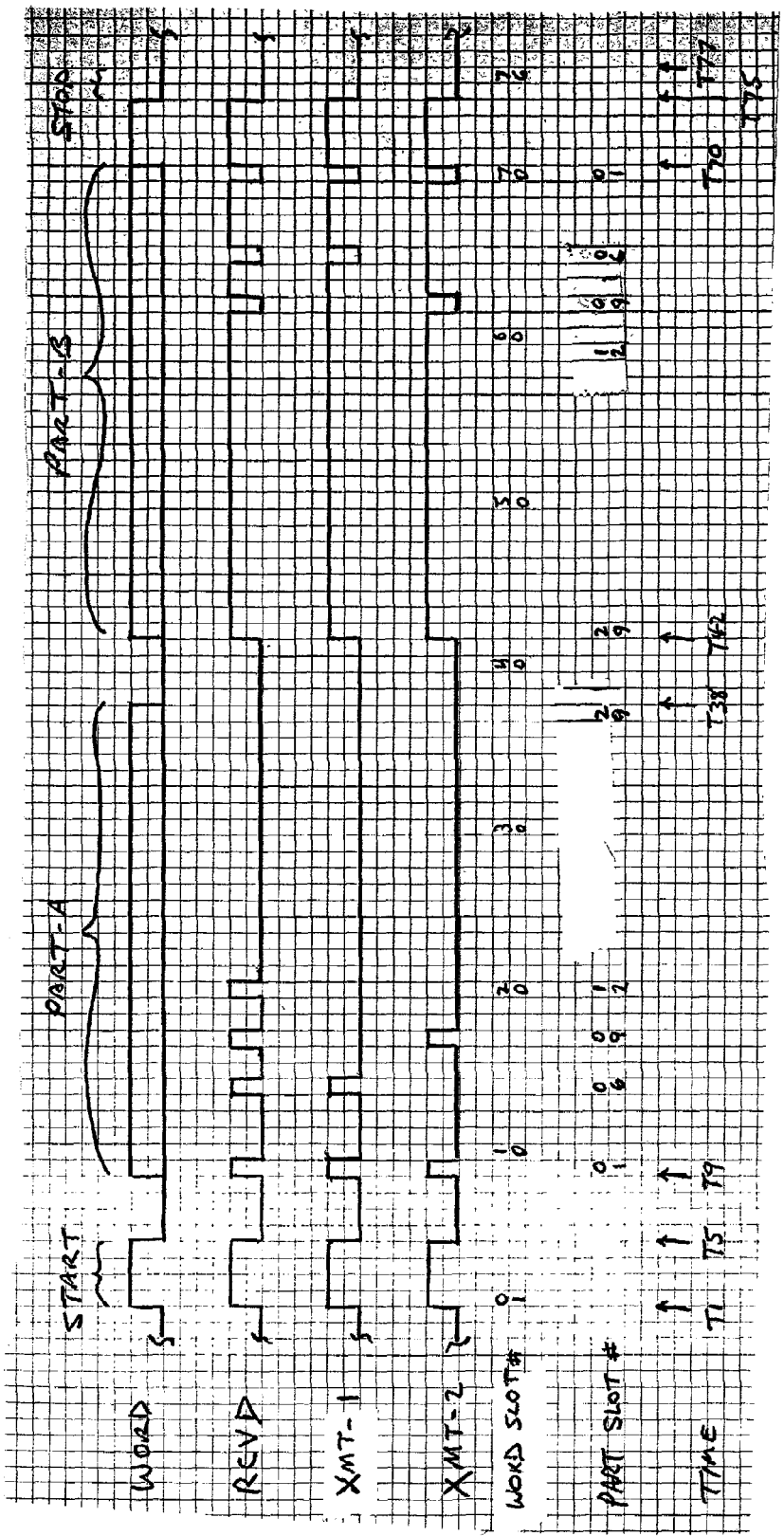
FIG. 8 is a timing diagram of a protocol for communicating according to various aspects of the present invention.

Turning to FIG. 8, an example protocol used in wireless monitoring systems will now be described. The primary purpose of the following protocol is to enable a receiving unit and/or associated processing unit to decipher or read multiple transmissions when two or more tags happen to begin transmitting at the same time. The following heading describe the situations where two tags randomly begin transmitting simultaneously:
  XMT—1 and XMT—2—represent a word transmitted from respective tags;
  RCVD—represents the transmitted and/or noise signals received by the system receiver;
  WORD—represents an example period and parts of a single word transmission of the inventive protocol;

Word Slot #—represents the number of slots in the period of a single word;

Part Slot #—represents the slot number of the respective parts contained in the word; and Time—represents segments of time through the signals beginning with the first edge of a start pulse and ending with the stop gap of the word.

There are three primary rules of the inventive protocols which will be discussed first in respect to their purpose.

Protocol Rule #1:

A valid tag transmission must include two parts, a first part and a second complementary part. Pulses in PART-A must appear in complement in PART-B. (PART-B pulses are inverse in magnitude and time with respect pulses in PART-A).

Protocol Rule #2: A valid tag transmission must include a predetermined number of pulses and a minimum gap between the pulses. In the exemplary embodiment depicted in FIG. 8, a valid protocol must include two pulses in PART-A which are separated by four or more slots.

Protocol Rule #3: Each tag transmission must include a specific start, stop and gap configuration. In the illustrated example, each transmission includes: a start pulse having a width of four slots; a first gap consisting of four slots immediately following the start pulse; a second gap consisting of four slots between PART-A and PART-B; a stop pulse having a width of four slots; and a third gap consisting of four slots immediately following the stop pulse.

As shown, the timing sequence for the first word is as follows: T1=begin start signal; T5=end start signal, begin gap 1; T9-end gap 1, begin PART-A; T38=end PART-A, begin gap 2; T42=end gap 2, begin PART-B; T70=end PART-B, begin gap 3; T75=end gap 3, begin Stop signal; and T77 end stop signal. A second word may begin at T77 (e.g., rising edge of start signal as at T1 may occur at T77) or any time thereafter.

Individual pulse representations in slots represent assertions in that slot. An assertion may be a high or low signal representing a received signal including noise. Each assertion may be communicated by a coded signal having more than one "pulse" such as when a binary number code of several bits indicates assertion (e.g., 1011=yes; 0101=not asserted). Modulation of the signals may be any conventional type including FSK, PSK, FM and AM RCVD Signal: Based on the four pulses in PART-A of the RCVD signal, up to six tag ID combinations could be present the depicted configuration with only two tag transmissions are present (two pulses for each transmission). Using the foregoing Protocol Rules, the actual Tag IDs are readily determined. The following table represents the analysis of received signals and resulting logic conclusions:

| Possible Pulse Pairs (as identified by Part Slot #) | Conclusion | Rationale |
| --- | --- | --- |
| 1,6 | Valid, present | Min. Spacing OK, both complementary parts present. |
| 1,9 | Valid, present | Min. Spacing OK, both complementary parts present. |
| 1,12 | Invalid, ignored | PART-B pulse missing at 12 |
| 6,9 | Invalid, ignored | Not four slots between pulses |
| 6,12 | Invalid, ignored | PART-B pulse missing at 12 |

-continued

| Possible Pulse Pairs (as identified by Part Slot #) | Conclusion | Rationale |
| --- | --- | --- |
| 9,12 | Invalid, ignored | Not four slots between pulses; and PART-B pulse missing at 12 |

As seen from the known transmission signals, XMT-1 is a tag transmission with 1,6 ID and XMT-2 is a tag transmission with 1,9 ID.

A start pulse(s) is used to define the beginning of a message transmission. The start pulse can be a continuous carrier for a defined period of time (example above, four periods) or it can be a square wave, a series of 1's and 0's or a specific code or otherwise unique indicator of the start of a transmission. Utilizing a pulse which follows a certain length of gap or blank period cant further define it as a unique start function. The start pulse is then uniquely different to the following data or other stop or control pulses or information and, therefore, can be readily determined and identified with respect to the portions of the message or other messages. In the example of FIG. 8, the start of the message is indicated by the four period start pulse followed by a gap of four time periods. Other protocol parameters may be used and the specific length of time may vary.

A unique stop pulse is also used to define the end of a message word and/or the end of a message. The stop pulse is similar to the start pulse in that it is uniquely different from the start pulse, message, data and control information. In the depicted embodiment, a stop pulse width of two periods is used.

The first message word is constrained between the initial start pulse and the first stop pulse. Following words are contained between the stop pulses of one word and the next. In other words, a group of back-to-back words may have only one start pulse for an entire group of words. In this case, an additional stop pulse can follow the last word of a message, e.g., end of word (EOW) and end of message (EOM) indication. In this embodiment, the EOM is followed by a blank time, e.g., eight periods. A much greater blank time may be used between transmissions of another message by the same tag. In a common environment the message transmission might take ten milliseconds and the next transmission might not occur for ten seconds or more. In addition, the following period may vary from message transmission to message transmission as part of a programmed time diversity to minimize the chance that tag transmissions will collide.

As discussed above, four pulses are used to transmit the identification or ID of the tag or other control, sensor, status, data or other information; two pulses in PART-A and two complementary (complementary with respect to level and time) pulses in PART-B. In a typical message, ID or data is transmitted in seventy time periods (76 total minus four start pulse and two stop pulse time periods) between a start pulse and a stop pulse or between two stop pulses.

In the dual pulse example of FIG. 8, the first assertion of data (a zero value) is when the first pulse is located at word slot position nine (PART-A slot no. one) out of seventy-six periods and the corresponding complementary pulse is located at word slot position 70 (PART-B slot no. one) out of seventy-six. All valid pulses have a minimum of four spaces before and after them. These periods can be considered "anti-pulse" that are part of differentially confirming the presence of the pulses. The second assertion of data is represented by a pulse at word slot position fourteen (PART-A slot no. six) with its complementary pulse at Word slot position sixty-five (PART-B slot no. six). However, a minimum spacing of anti-pulses must be maintained between the first, second and fourth bits in the message. Therefore, as the first bit moves to a higher slot position in PART-A, the other alternatives for bit pulses is reduced. For example, if twenty-nine part slot numbers are available with a requirement of a four period gap between PART-A and PART-B, a total of three hundred mutually exclusive alternatives are possible. Generally, two hundred and fifty six of the three hundred may be used for ID or data coded for zero to two-hundred fifty six (i.e., 256 alternatives) and forty-four remaining alternatives are used to identify special control information.

In a typical message the first word is a control word that defines the remainder of the message. The following ID words are typically a series of three words can then define 256^3 alternatives or sixteen million alternatives. Four words can define four billion codes. One advantage of this protocol is that the processing of the information for one message can be performed without any previous knowledge of what code is expected. A full reading, assuming no collisions that might cause a message to be corrupted, can occur on a word or message basis. No information needs to be stored from one message to another. In essence, each message received, even if it overlaps other messages, can be treated as a single message for interpretation and decoding purposes. For example, if message A is received as initiated by its start pulse, and message B is received while A is still in the process then the receiver system only needs to read message A as one event and message B as another. Using high speed processing such as that employed in high-speed DSP, each event can time-share the processing task.

Another received overlapping message C can have a timer assigned and its message decoded or deciphered individually in a multiple task-processing environment. The messages might interfere with each other occasionally, however, this will result in individual message errors with each message. The cause and reason for the error does not necessarily have to be determined and each message can simply be treated as an independent event. In higher level of decoding it is possible to review all messages received and determine how one message might have introduced an error in another. It then perhaps is possible to correct for the error since the reasons are known.

It has been calculated that a message rate and density or number of tags that should cause overlapping and potential collision of about forty percent will provide a maximum throughput rate. This assumes that messages that are tightly compressed with minimum periods possible might handle overlaps of three to five messages with a nominal being three. This is a function of the density of the message. The messages can be greatly lengthened in order to minimize overlapping collisions. However, this can create its own problems since it is desired to have the shortest message length possible to provide the maximum time for each message to be communicated without overlaps or collision.

A significant advantage of the inventive protocols is that pulses need only to be determined to exist in one time period or another. A complex reading of encoded bits is not needed. A differential comparison can be made between a derived base reference level in the decoder and the level and status before and after every pulse pattern; that is, the anti-pulses can be compared in an analog and/or digital fashion to the pulses. Every data or ID pulse by definition should have four empty spaces or anti-pulses before and after except in the case where there might be an overlap between two or more tags. In this case one or more of the spaces between pulses should be off or zero or be an anti-pulse. If the anti-pulses have an amplitude of, for example, one volt and the pulse presence results in four volts then a differential read between them is three volts.

The previously described protocol can be used in a synchronous and/or non-synchronous environment. Tags can be synchronized when they are activated by the same event such as movement or receive a signal that causes them to initiate transmission. In a non-synchronous environment all the tags are randomly timed and have no set relationship between them. In a synchronous environment the tags are all timed to start together at the same time and, therefore, have a greater chance to collide.

Alternative Protocol Features

According to one aspect of the invention, assertions may presented using amplitude keying, e.g., assertion=the carrier signal on, and non-assertions=the carrier signal off.

In another protocol variation, in a word transmission from a tag to a receiver, from a transmitter to a tag, or from a transmitter to a receiver (e.g., locator to receiver), the first word of a transmission may have a fixed format which includes control codes defining the format to be used for the second and following words. The second and following words (until another control code is received for changing word formats) may include more or fewer time slots per PART. A different assertion/non-assertion technique may be identified by a suitable control code.

In yet another variation of the monitoring system protocols, PART-A (and inversely PART-B) may be divided into discreet portions of consecutive slots referred to herein as "subparts." Turning to FIG. 9, WORD 900 format is similar to that discussed in respect to FIG. 8 but is divided into subparts. By partitioning the slots in the format of word 900, multiple pieces of information content such as sensor or battery readings, memory or register contents, can be conveyed independent of other subpart contents.

According to yet another variation of the monitoring system protocols, the signal strength of a transmitted assertion may be used for attributing assertions to a specific transmitting source (e.g., tag or locator). In this variation, the magnitude of a transmitted signal representing assertions from stationary transmit sources will vary according to the transmit source distance from the receiver or obstacles in there between. By tracking magnitude of these signals, the various transmitting signals can be distinguished, particularly when assertions overlap one another.

In another variation of the monitoring system protocols, transmitted signals may be selected (or rejected) based on a threshold signal strength. A multiple threshold comparator circuit (such as that shown in FIG. 4) and/or digital filtering techniques may be used to accomplish this end. By using a multiple threshold detector, the sensitivity of the receiver may be set to different levels for different purposes. For example, a higher threshold level can be used to read the closer and shorter pulse length tag signal and a lower level can be used to capture long range, but longer period and pulse length transmissions. As with the comparator discussed in respect to the tag signal strength capabilities discussed previously, the resulting detected signals can be "and'ed" or "or'ed" together so that a strong signal overrides a weak noisy signal but a weak, noisy signal can still be read.

Alternatively, signals may be selected or rejected based on frequency ranges (one or more bandpass filters may accommodate this type of frequency monitoring).

The present invention has heretofore been discussed primarily in respect to broadcasting transmissions in the context of radio wave and/or microwave transmissions. Notwithstanding, the present invention including monitoring systems and related protocols may be used in any type of wireless communication utilizing any frequency of electromagnetic waves. Specifically, it is contemplated that broadcasts between system components may be performed using infrared or other communication techniques in the visible and non-visible light spectrum.

Unless contrary to physical possibility, the inventor envisions the methods and systems described herein: (i) may be performed in any sequence and/or combination; and (ii) the components of respective embodiments combined in any manner.

Although there have been described preferred embodiments of this novel invention, many variations and modifications are possible and the embodiments described herein are not limited by the specific disclosure above, but rather should be limited only by the scope of the appended claims.

What is claimed is:

1. In a system for monitoring location of tags, the system comprising at least two of a monitor, a locator, and a tag, a method performed by at least one of the monitor, the locator, and the tag for transmitting a message, the message comprising a first group of slots and a second group of slots, the method comprising:
   generating a first part of a message by inserting a high or low signal in each slot within a first group of slots, such that the high signals are separated in time by a minimum number of slots;
   transmitting the first part of the message; and
   transmitting a second part of the message, wherein the second part's high and low signals within a second group of slots are in reverse order from those in the first part.

2. In a system for monitoring location of tags, the system comprising at least two of a monitor, a locator, and a tag, a method performed by at least one of the monitor, the locator, and the tag for transmitting a message, the message comprising a first group of slots and a second group of slots, the method comprising:
   generating a first part of a message by inserting a high or low signal in each slot within a first group of slots, such that the high signals are separated in time by a minimum number of slots;
   transmitting the first part of the message; and
   transmitting a second part of the message, wherein the second part's high and low signals within a second group of slots are inverse in magnitude from those in the first part.

3. In a system for monitoring location of tags, the system comprising at least two of a monitor, a locator, and a tag, a method performed by at least one of the monitor, the locator, and the tag for transmitting a message, the message comprising a first group of slots and a second group of slots, the method comprising:
   generating a first part of a message by inserting high or low signal in each slot within a first group of slots, such that the high signals are separated in time by a minimum number of slots;
   transmitting the first part of the message; and
   transmitting a second part of the message, wherein the second part's high and low signals within a second group of slots are inverse in time and magnitude from those in the first part.

4. The method of claim 1, 2, or 3 wherein the first group of slots consists of a total number of slots and the second group of slots consists of the total number of slots.

5. The method of claim 1, 2, or 3 wherein:
   the message comprises a plurality of words, each word comprising a respective first group of slots; and
   a first word of the plurality of words comprises indicia of the number of slots of the first group of slots in a subsequent word of the plurality of words.

6. The method of claim 1, 2, or 3 wherein the message comprises indicia for identifying within the first group of slots a plurality of subparts.

7. The method of claim 1, 2, or 3 wherein:
   each group of slots comprises a plurality of subparts, each subpart for conveying a respective series; and
   selecting, and transmitting are accomplished with respect to each series so that the first group of slots conveys each respective series and the second group of slots conveys the respective series.

8. The method of claim 1, 2, or 3 wherein:
   each group of slots comprises a plurality of subparts, each subpart for conveying a respective series;
   selecting, and transmitting are accomplished with respect to each series so that the first group of slots conveys each respective series and the second group of slots conveys the respective series; and
   the plurality of subparts conveys location identification information.

9. The method of claim 1, 2, or 3 wherein the message comprises location identification information and a command.

10. The method of claim 1, 2, or 3 performed by at least one of the locator and the monitor, wherein the message comprises a command to be performed by the tag.

11. The method of claim 1, 2, or 3 performed by at least one of the locator and the monitor, wherein the message conveys a command to be performed by the tag to alter a beacon rate of the tag in accordance with the command.

12. The method of claim 1, 2, or 3 performed by at least one of the locator and the monitor, wherein the message conveys a command to be performed by the tag to activate a mode of operation of the tag from a set of modes comprising a beaconing mode and an interrogated mode.

13. The method of claim 1, 2, or 3 wherein assertion comprises a code comprising a plurality of bits.

14. A system for monitoring location of tags, the system comprising a monitor, a plurality of locators, and a plurality of tags, communication from a sender, being at least one of the monitor, a particular locator, and a particular tag, comprising a message that includes a first group of slots and a second group of slots, the sender comprising:
   means for generating a first part of a message by inserting a high or low signal in each slot within a first group of slots, such that the high signals are separated in time by a minimum number of slots;
   means for transmitting the first part of the message; and
   means for transmitting a second part of the message, wherein the second part's high and low signals within a second group of slots are in reverse order from those in the first part.

15. A system for monitoring location of tags, the system comprising a monitor, a plurality of locators, and a plurality of tags, communication from a sender, being at least one of the monitor, a particular locator, and a particular tag, comprising a message that includes a first group of slots and a second group of slots, the sender comprising:

means for generating a first part of a message by inserting a high or low signal in each slot within a first group of slots, such that the high signals are separated in time by a minimum number of slots;

means for transmitting the first part of the message; and means for transmitting a second part of the message, wherein the second part's high and low signals within a second group of slots are inverse in magnitude from those in the first part.

16. A system for monitoring location of tags, the system comprising a monitor, a plurality of locators, and a plurality of tags, communication from a sender, being at least one of the monitor, a particular locator, and a particular tag, comprising a message that includes a first group of slots and a second group of slots, the sender comprising:

means for generating a first part of a message by inserting high or low signal in each slot within a first group of slots, such that the high signals are separated in time by a minimum number of slots;

means for transmitting the first part of the message; and means for transmitting a second part of the message, wherein the second part's high and low signals within a second group of slots are inverse in time and magnitude from those in the first part.

17. The system of claim 14, 15, or 16 wherein the first group of slots consists of a total number of slots and the second group of slots consists of the total number of slots.

18. The system of claim 14, 15, or 16 wherein:

the message comprises a plurality of words, each word comprising a respective first group of slots; and a first word of the plurality of words comprises indicia of the number of slots of the first group of slots in a subsequent word of the plurality of words.

19. The system of claim 14, 15, or 16 wherein the message comprises indicia for identifying within the first group of slots a plurality of subparts.

20. The system of claim 14, 15, or 16 wherein:

each group of slots comprises a plurality of subparts, each subpart for conveying a respective series; and the means for selecting and each means for transmitting operate with respect to each series so that the first group of slots conveys each respective series and the second group of slots conveys the respective series.

21. The system of claim 14, 15, or 16 wherein:

each group of slots comprises a plurality of subparts, each subpart for conveying a respective series;

the means for selecting and each means for transmitting operate with respect to each series so that the first group of slots conveys each respective series and the second group of slots conveys the respective series; and the plurality of subparts conveys location identification information.

22. The system of claim 14, 15, or 16 wherein the message comprises location identification information and a command.

23. The system of claim 14, 15, or 16 wherein the message comprises a command to be performed by the tag.

24. The system of claim 14, 15, or 16 wherein the message conveys a command to be performed by the tag to alter a beacon rate of the tag in accordance with the command.

25. The system of claim 14, 15, or 16 wherein the message conveys a command to be performed by the tag to activate a mode of operation of the tag from a set of modes comprising a beaconing mode and an interrogated mode.

26. The system of claim 14, 15, or 16 wherein assertion comprises a code comprising a plurality of bits.

* * * * *

UNITED STATES PATENT AND TRADEMARK OFFICE
CERTIFICATE OF CORRECTION

PATENT NO. : 7,030,731 B2  
APPLICATION NO. : 10/172713  
DATED : April 18, 2006  
INVENTOR(S) : Freiwald et al.

Page 1 of 1

It is certified that error appears in the above-identified patent and that said Letters Patent is hereby corrected as shown below:

On Title Page item (75) for the Inventors:

Before "Roc Lastinger" insert --Dean Freiwald, Scottsdale, AZ (US);--.
After "William Fowler" Phoenix, AZ (US); delete "Dean Freiwald, Mesa, AZ (US)."

Signed and Sealed this

Twenty-second Day of August, 2006

JON W. DUDAS  
*Director of the United States Patent and Trademark Office*